(No Model.)

A. M. MACE.
STEAM COOKER.

No. 256,230. Patented Apr. 11, 1882.

Witnesses;
H. G. Manning.
W. R. Marble.

Inventor;
Alonzo M. Mace.
By Sylvenus Walker
Attorney

UNITED STATES PATENT OFFICE.

ALONZO M. MACE, OF NEEDHAM, MASSACHUSETTS.

STEAM-COOKER.

SPECIFICATION forming part of Letters Patent No. 256,230, dated April 11, 1882.

Application filed March 4, 1882. (No model.)

*To all whom it may concern:*

Be it known that I, ALONZO M. MACE, of Needham, in the county of Norfolk and State of Massachusetts, have invented certain new and useful Improvements in Steam-Cookers, of which the following is a specification.

The object of my invention is to provide suitable devices whereby an extra pressure of steam may be maintained upon the water in the boiler and the steam-chambers connected therewith, so as to prevent the water boiling until there is a higher degree of heat generated within the cooker than 212° centigrade, thereby greatly facilitating the cooking of food placed within the same, as the temperature may be raised sufficiently to bake some kinds of food; and it consists in the construction, combination, and arrangement of the several parts of the device, as hereinafter more fully described, and set forth in the claims.

Figure 1:
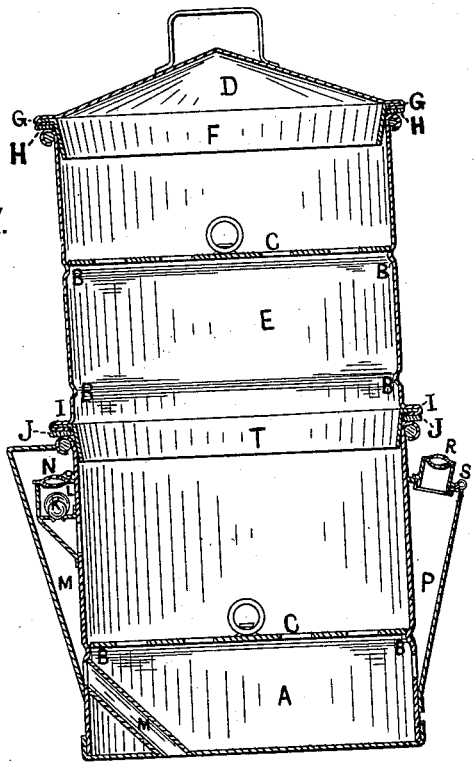
Figure 2:
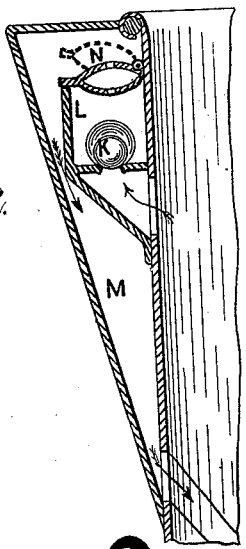

Figure 1 represents a vertical central section of a steam-cooker constructed according to my invention. Fig. 2 represents a vertical section of the weighted automatic valve and hinged whistle, and steam-exit tube drawn to an enlarged scale.

A represents the boiler provided with the internal annular rib or projection B, upon which rests the removable perforated horizontal partition C, upon which food may be placed directly or in suitable utensils placed thereon, as heretofore, (water having been put into said boiler A.) One or more sections, E, are provided with similar ribs, B, and horizontal perforated partitions C arranged therein as may be desired. A cone-shaped cover, D, is placed upon the mouth of the upper section, and its conical downward projecting flange F is forced downward tightly within the same until the rubber packing-ring H contacts with the top edge of such upper or lower section E, so as to close the joint between these parts steam-tight, said packing-ring H having a bearing against the under face of the horizontal projecting flange G of the said cover D. This cover so constructed is adapted to fit upon and within the mouth of the lower section, containing the boiler A, and the lower portion of the removable upper section E is provided with a downward conical projecting flange T and horizontal projecting flange I, provided with a rubber packing-ring, J, precisely identical with that portion of the cover intended to form a steam-tight joint, thus producing a steam-tight culinary or cooking vessel, as heretofore.

Now in order to hold the steam when generated therein until it reaches a degree of heat above 212° centigrade, I construct a weighted automatic valve, K, arranged within the chamber L, inclosed by the steam-escape tube M, said chamber being provided with a hinged steam-whistle, N, above the said valve K, so as to indicate the escape of any steam, thereby signaling too great heat, and giving notice that the cooker had better be removed a little farther from the fire, so as to allow the surplus steam to condense on the cover and sides of the utensil, and run down into the water in the boiler, and thus save all the nutriment of the food being cooked, such product forming the basis of a soup; but if the cooker be permitted to remain over the fire, or at the same degree of heat, no harm would occur to the contents, as the extra pressure of steam would raise the said hinged steam-whistle N, which may be weighted or held down by a spring, if desired, as shown in dotted lines, Fig. 2, and escape downward through the tube M, carrying the essential oils held in the steam into the fire, and burn the same, so as to leave no odor in the room.

Should the water become too low in the boiler A, steam would enter through the orifice in the side thereof and upward through the tube P, sounding the whistle R, provided in the hinged cap S, when hot water should be poured therein, so as to fill the boiler without interrupting the cooking.

This construction forms a very simple, practical, and efficient steam-cooker, adapted to the wants of every household.

Having thus described my invention, what I claim is—

1. In combination with the boiler A, having a packed steam-tight cover, D, the weighted automatic valve K, arranged within the chamber L, and the hinged alarm or whistle N, inclosed within the steam-escape tube M, substantially as described, as and for the purposes set forth.

2. In combination with the boiler A, having a cover, D, and provided with a steam-escape tube, M, the alarm or whistle N, arranged within the steam exit passage, substantially as described, as and for the purposes set forth.

ALONZO M. MACE.

Witnesses:
SYLVENUS WALKER,
GEO. H. ROOT.